US005489925A

United States Patent [19]

Brooks et al.

[11] Patent Number: 5,489,925

[45] Date of Patent: Feb. 6, 1996

[54] INK JET PRINTING SYSTEM

[75] Inventors: Jeffrey B. Brooks; Mark S. Noyes, both of Keene; Frank W. Martines, Temple, all of N.H.; Charles W. Spehrley, Jr., White River Junction, Vt.; Steven H. Barss, Wilmot Flat; Edward R. Moynihan, West Lebanon, both of N.H.; Nathan P. Hine, South Strafford, Vt.; David W. Gailus, Merrimack, N.H.

[73] Assignee: Markem Corporation, Keene, N.H.

[21] Appl. No.: 57,091

[22] Filed: May 4, 1993

[51] Int. Cl.[6] .................... G01D 15/16

[52] U.S. Cl. .................... 347/6; 347/85

[58] Field of Search .................... 347/6, 7, 85, 86

[56] References Cited

U.S. PATENT DOCUMENTS

| | | | |
|---|---|---|---|
| 4,340,896 | 7/1982 | Cruz-Uribe et al. | 347/6 |
| 4,494,124 | 1/1985 | Piatt et al. | 347/85 |
| 4,607,266 | 8/1986 | DeBonte | 347/85 |
| 4,651,161 | 3/1987 | Rich et al. | 347/6 |
| 4,684,962 | 8/1987 | Hirosawa | 347/85 |
| 4,700,205 | 10/1987 | Rich et al. | 347/6 |
| 4,727,378 | 2/1988 | Le et al. | 347/35 |
| 4,734,711 | 3/1988 | Piatt et al. | 347/85 |
| 4,791,438 | 12/1988 | Hanson et al. | 347/85 |
| 4,814,786 | 3/1989 | Hoisington | 347/85 |
| 4,862,192 | 8/1989 | Slomianny | 347/85 |
| 4,870,431 | 9/1989 | Sousa et al. | 347/30 |
| 4,929,963 | 5/1990 | Balazar | 347/17 |
| 4,959,662 | 8/1990 | Kobayashi | 347/35 |
| 4,992,802 | 2/1991 | Dion et al. | 347/86 |
| 5,103,243 | 4/1992 | Cowger | 347/86 |
| 5,113,199 | 5/1992 | Chan et al. | 347/85 |
| 5,121,130 | 6/1992 | Hempel et al. | 347/17 |
| 5,182,572 | 1/1993 | Merritt et al. | 347/99 |
| 5,184,147 | 2/1993 | MacLane et al. | 347/30 |
| 5,185,614 | 2/1993 | Courian et al. | 347/29 |
| 5,189,443 | 2/1993 | Arashima | 347/47 |

FOREIGN PATENT DOCUMENTS

| | | |
|---|---|---|
| 0036295 | 9/1981 | European Pat. Off. . |
| WO9108903 | 6/1991 | WIPO . |

*Primary Examiner*—Benjamin R. Fuller
*Assistant Examiner*—Valerie Ann Lund
*Attorney, Agent, or Firm*—Brumbaugh, Graves, Donohue & Raymond

[57] ABSTRACT

In the ink jet printing system described in the specification, a hot melt ink jet printhead having two ink reservoirs is coupled through an ink supply line to a remote hot melt ink supply and a temperature controller is arranged to control the temperatures of the ink in the remote ink supply, the supply line, the ink reservoirs in the printhead and passages leading from the reservoirs to the ink jet orifices at selected temperature levels to inhibit high-temperature degradation of the ink while permitting the ink to be jetted at the desired jetting temperature. In addition, a pressure control system controls the pressure of the ink in the printhead at one or more selected levels to permit the printhead to be used at different orientations and to permit purging of air bubbles and contaminants from the orifice passageways and to supply a relatively high vacuum to a deaerator in the printhead to extract dissolved air from the ink. A check valve in the ink supply line permits the printhead to be positioned at different elevations with respect to the remote ink supply without causing any undesired flow of ink between the reservoir and the printhead.

21 Claims, 5 Drawing Sheets

INK JET PRINTING SYSTEM

BACKGROUND OF THE INVENTION

This invention relates to ink jet printing systems and, more particularly, to a new and improved ink jet printer having a printhead capable of ink jet printing in different orientations and relative positions.

Ink jet printing systems include a printhead having small orifices through which ink is ejected in a controlled manner to form an image on an adjacent substrate. To counteract the effect of capillary action in the small orifices which would otherwise cause ink to seep out of the printhead when not in use but, at the same time, prevent air from being drawn into the printhead through the orifices, the ink in the printhead must be maintained at a selected negative pressure which is dependent upon the orifice size and the ink characteristics and may be, for example, about 2 to 3 inches of water. In ink jet printing systems having a remote ink supply connected to the printhead through a supply line, however, the pressure of the ink in the printhead can be affected by the relative vertical positions of the printhead and the remote ink supply. Moreover, many ink jet printers are designed to operate only in one orientation of the printhead, which limits the manner in which the ink jet system can be used.

In ink jet printing systems using hot melt ink, which is solid at room temperature and becomes liquid at elevated temperatures, the ink is ejected from the printhead at a relatively high temperature which is sufficient to ensure low enough viscosity of the ink for the desired operation. Such hot melt inks, however, tend to deteriorate when maintained at high temperature, which tends to limit the usefulness of hot melt ink jet printing systems.

SUMMARY OF THE INVENTION

Accordingly, it is an object of the present invention to provide a new and improved ink jet printing system which overcomes the disadvantages of the prior art.

Another object of the invention is to provide an ink jet printing system having a printhead which can be operated in any desired orientation or any vertical position with respect to a remote ink supply.

A further object of the invention is to provide a hot melt ink jet printing system in which deterioration of the ink is inhibited.

These and other objects of the invention are attained by providing an ink jet printing system having a remote ink supply connected through a supply line to an ink jet printhead which may be mounted at any desired orientation or position and a pressure control system capable of varying the pressure of the ink in the printhead so as to maintain the ink pressure in the head at the desired level regardless of the orientation or position of the head. In addition, the ink jet printing system of the present invention is arranged to control the temperature of hot melt ink used in the system so as to inhibit degradation by separately controlling the temperature of ink in a remote ink supply, in the supply line, in an ink reservoir on the printhead, and in passages leading from the printhead reservoir to the ink jet orifices so that only the ink in the passages leading to the orifices is maintained at the temperature required for jetting, while the temperature of the ink in the other portions of the system is maintained at appropriate lower levels to reduce the possibility of degradation.

In a particular embodiment of the invention, the pressure of the ink in the printhead is selectively controlled at any of a plurality of different pressure levels by providing an air pressure control system capable of producing any of a plurality of positive and negative air pressure levels for selective connection to the printhead to control the pressure of the ink therein at a desired negative level during printing and also to provide a desired positive pressure to the ink in the ink jet head for purging purposes. To prevent the elevation of the printhead with respect to a remote ink supply reservoir from causing a flow of the ink between the printhead and the remote reservoir while permitting ink to be supplied from the remote reservoir to the printhead as needed, the supply line from the remote reservoir to the printhead includes a check valve requiring at least a selected minimum pressure at least equal to the pressure corresponding to the maximum elevational distance between the remote reservoir and the printhead, such as 5 psi, to be applied to transfer ink to the printhead. In addition, to permit use of the printhead in orientations in which two printhead reservoirs are located at different elevations, the pressure control system of the present invention may be arranged to apply different pressures to each of the printhead reservoirs.

In one preferred pressure control arrangement, air is drawn by a vacuum pump through flow paths of uniform cross-section, such as grooves in the surface of a covered plate having different lengths and thereby producing different negative pressure levels, and each of those paths is selectively connectable to the ink reservoirs in the printhead to provide a controlled negative pressure therein. The pressure control unit may be tested for leaks by determining the pump duty cycle required to produce a selected pressure level and comparing it with a predetermined duty cycle.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
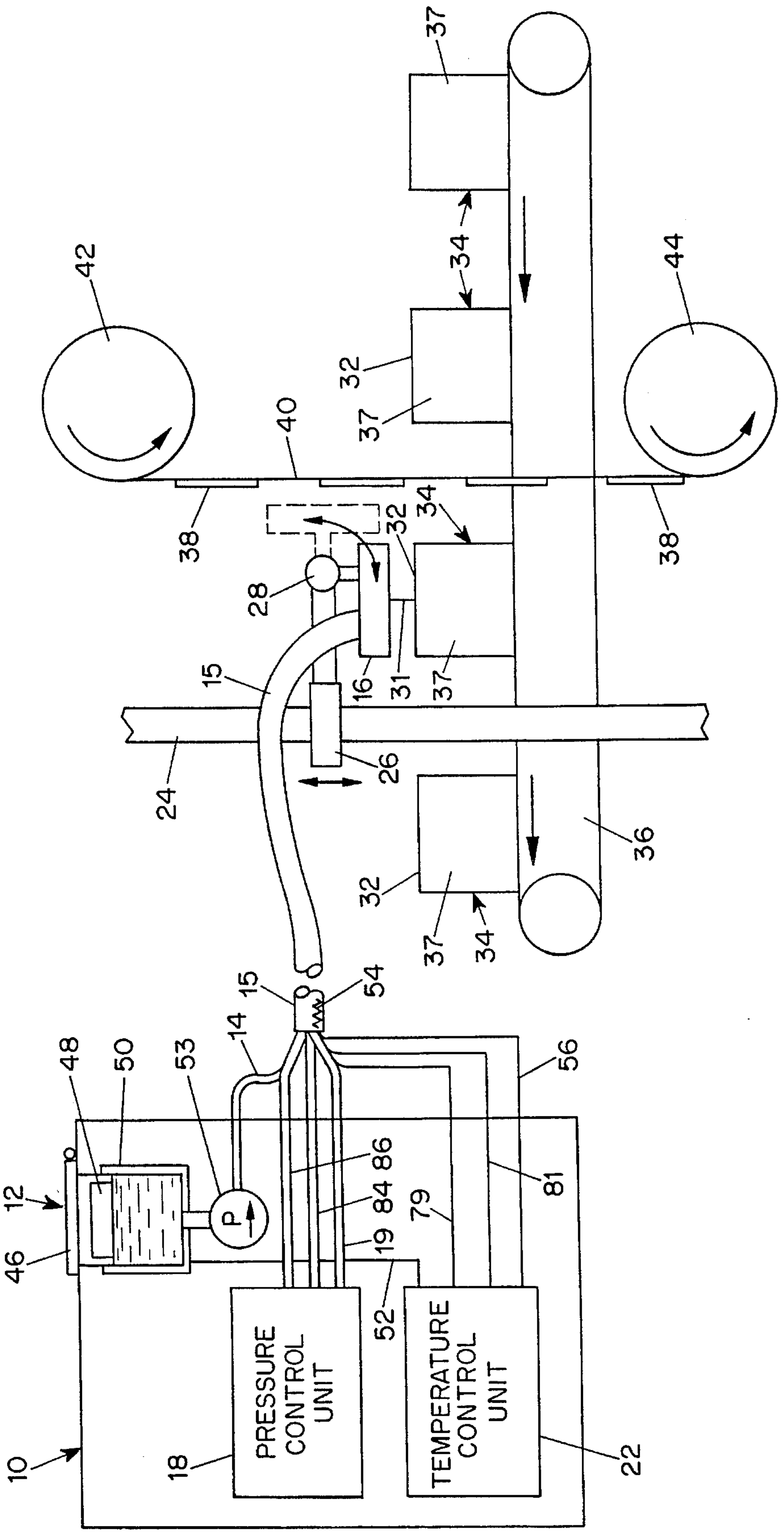
FIG. 1 is a schematic illustration showing the overall arrangement of a representative ink jet printing system arranged in accordance with the invention.

In the typical embodiment of an ink jet printing system according to the invention shown in FIG. 1, a main control unit 10 includes a remote ink supply reservoir 12 connected through an ink supply conduit 14 in a cable 15 to an ink jet printhead 16 and a pressure control unit 18 connected to the ink jet printhead 16 through three air conduits 19, 84 and 86, also carried by the cable 15. In addition, the main control unit 10 includes a temperature control unit 22 for controlling the temperature of hot melt ink in various portions of the ink jet system in a manner to be described hereinafter.

To facilitate positioning of the printhead 16 adjacent to different types of objects to which printing is to be applied, the printhead is movably supported on a vertically disposed column 24 so as to be locked by a clamp 26 at any desired vertical position on the column. In addition, the printhead 16 is supported for pivotal motion in any vertical plane by a clampable universal joint 28 so that the printhead can be oriented to permit a linear array of ink jet orifices 30 therein, best seen in FIG. 2, to project ink horizontally, either in a horizontal line or in a vertical line, or downwardly.

In the arrangement illustrated in FIG. 1, the printhead is disposed in a horizontal orientation as shown in solid lines to cause the printhead orifices 30 (shown in FIG. 2) to project a train of ink drops 31 downwardly onto the top surfaces 32 of a series of containers 34 which are conveyed in the horizontal direction by a conveyor 36, thus permitting appropriate information to be printed on the top surface of each of the containers. If desired, the printhead can be lowered on the column 24 and the universal joint 28 can be arranged to clamp the head 16 in a sidewise orientation with the array of orifices 30 extending vertically and facing the near sides 37 of the containers 34, as viewed in the drawing, so as to cause information to be printed on the sides of each of the containers as they are conveyed past the printhead by the conveyor 36.

In still another printhead position, the printing system of the invention may be arranged to print a series of labels 38 conveyed on a tape 40 in a vertical direction from one reel 42 to another reel 44 by adjusting the universal joint 28 to clamp the printhead in a vertical orientation, as shown in dotted outline in FIG. 1, so that the array of orifices 30 extends horizontally and faces the labels 38 as they are conveyed in the vertical direction.

The ink supply reservoir 12 in the main control unit 10, which has a sealing cover 46, is arranged to receive a block 48 of solid hot melt ink and has a thermostatically controlled heater 50 connected by a line 52 to the temperature control unit 22. The temperature control unit 22 is arranged to control the heater 50 so as to heat the block of hot melt ink 48 sufficiently to melt it and to maintain the ink in the supply reservoir 12 at a temperature just above its melting point so that it is sufficiently liquid that it can be transferred by a pump 53 through the supply conduit 14 to the printhead 16 as required. At the same time, the ink temperature in the supply reservoir 12 is kept low enough so that no appreciable degradation will take place even though the ink is maintained continuously at that temperature for several days or weeks. Similarly, the ink supply conduit 14 contains a thermostatically controlled heater 54 connected through a line 56 to the temperature control unit 22 so that the ink in the supply line is also maintained continuously in liquid condition, but at a temperature low enough that no appreciable degradation occurs.

Figure 2:
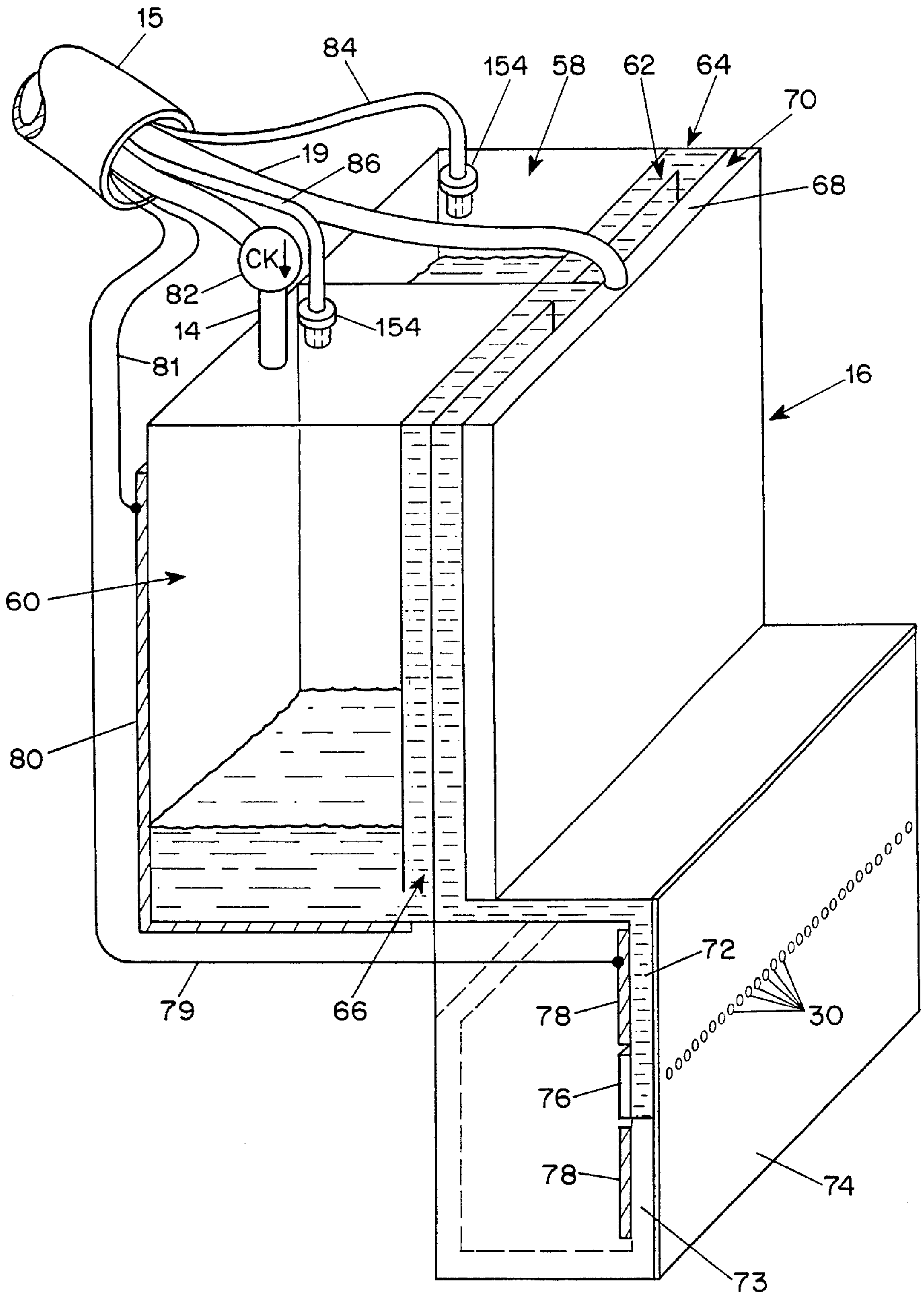
FIG. 2 is a schematic diagrammatic perspective view illustrating the arrangement of a representative ink jet printhead for use in the system shown in FIG. 1.
Figure 3:
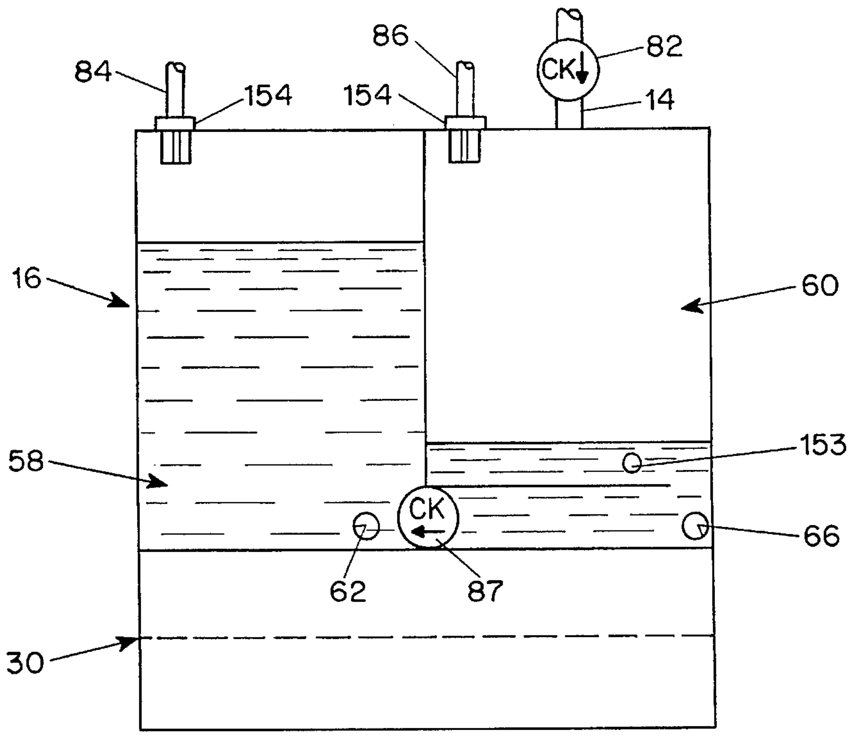
FIG. 3 is a schematic rear view of the printhead shown in FIG. 2 positioned vertically for horizontal ejection of ink with the orifice array oriented in a horizontal line.
Figure 4:
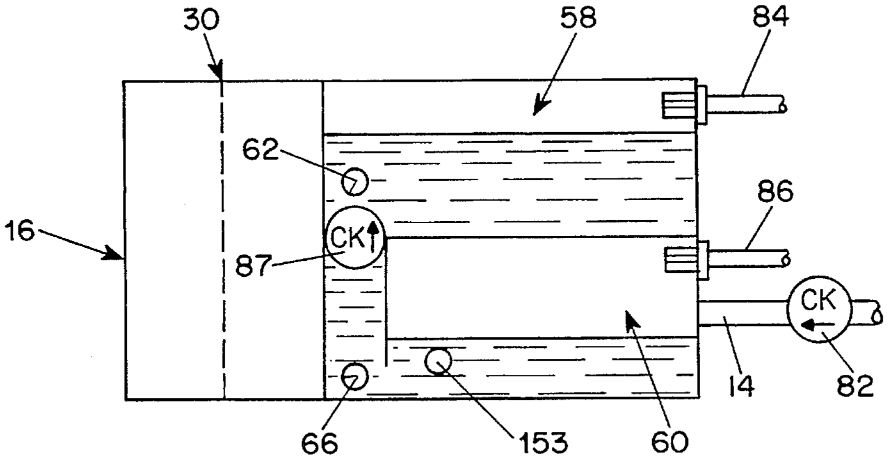
FIG. 4 is a schematic rear view of the printhead shown in FIG. 2 positioned in a sidewise orientation for horizontal ejection of ink with the orifice array oriented in a vertical line.
Figure 5:
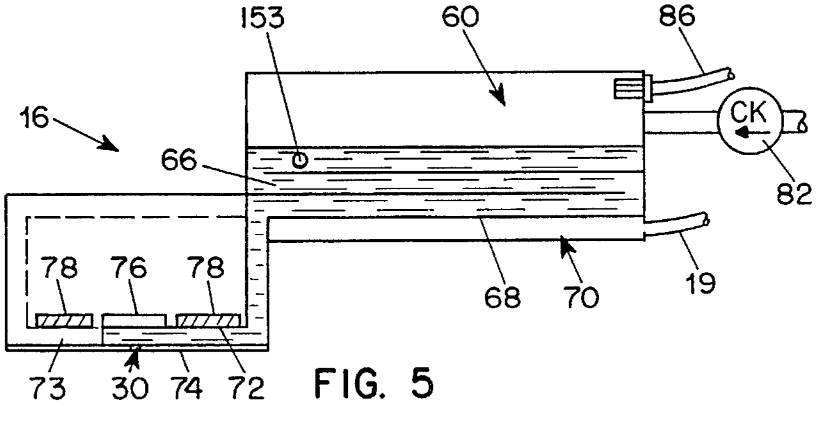
FIG. 5 is a schematic side view of the printhead shown in FIG. 2 positioned horizontally for downward ejection of ink from the orifices.

As best seen in the enlarged schematic illustration of FIG. 2 and the further illustrations of FIGS. 3–5, the printhead 16 includes two ink reservoirs 58 and 60 containing ink at different levels, a passage 62 leading from the high level reservoir 58 to a deaerator 64 and another passage 66 leading from the low level reservoir to the deaerator 64. The passages 62 and 66 pass downwardly as viewed in FIGS. 2 and 3 in the deaerator 64 adjacent to a membrane 68 which separates those passages from a vacuum chamber 70 connected to the vacuum line 19 from the pressure control unit 18. That line and the chamber 70 are maintained at a pressure level of about 25 in.Hg. to extract dissolved air from the ink passing through the passages 64 and 66 adjacent to the membrane 68. After passing through the deaerator 64, the ink passages 62 and 66 extend downwardly to supply alternately adjacent orifices 30 respectively in the array, ink from the low level reservoir being supplied through a passage 72 shown in FIG. 2 which extends downwardly adjacent to an orifice plate 74 to supply alternate odd-numbered orifices in the array, and ink from the high level reservoir being supplied downwardly to the bottom of the orifice plate 74 and upwardly adjacent to the orifice plate to the alternate even-numbered orifices 30 through a passage 73 illustrated in dotted line in FIG. 3.

Each of the orifices 30 in the printhead 16 has an associated transducer 76 arranged to respond to electrical signals to eject ink drops through the corresponding orifice in the usual manner, as described, for example, in the Fischbeck et al. U.S. Pat. No. 4,584,590, the disclosure of which is incorporated herein by reference. An appropriate arrangement of the ink passages 72 and 73, transducers 76, orifices 30 and supply passages 62 and 66 is described in detail in the Hoisington et al. U.S. Pat. No. 4,835,554, the disclosure of which is also incorporated herein by reference.

In order to maintain the ink in the orifice passages 72 and 73 at the temperature required for jetting through the orifices 30, a heater 78 is mounted in the printhead adjacent to the passages 72 and 73 and is connected through a line 79 in the cable 15 to the temperature control unit 22. In addition, a further heater 80 is mounted adjacent to the reservoirs 58 and 60 and is connected to the control unit 22 by a line 81. The control unit is arranged to maintain the temperature of the ink in the reservoirs 58 and 60 at a temperature sufficiently below the jetting temperature to avoid degradation, but close enough to the jetting temperature to permit the orifice passage heater 78 to heat the ink quickly to the jetting temperature as the ink is supplied through the passages 72 and 73 to the orifices 30.

As an example, for a hot melt ink which has a melting point of about 90° C. and tends to degrade when maintained for substantial periods of time at temperatures above 130° C., the temperature control unit 22 may be arranged to maintain the temperature of the ink in the remote ink supply reservoir 12 and in the ink supply conduit 14 at a temperature of about 100° C. and to control the heater 80 to maintain the ink in the reservoirs 58 and 60 at a temperature of about 125° C., but to control the heater 78 so as to maintain the ink in the passages 72 and 73 leading to the orifices 30 at a jetting temperature of 137° C. Since only a small quantity of ink is maintained in the passages 72 and 73 and, during operation, the ink passes through those passages relatively rapidly, no significant degradation of ink can occur during operation of the ink jet system.

When the ink jet system is not in use, but is being maintained ready for use as, for example, during the course of a working day in which the system is used only periodically, the temperature control unit 22 reduces the temperature of the ink in the passages 72 and 73 to a lower level, such as the 125° C. temperature of the ink in the reservoirs 58 and 60. Moreover, if the capacity of the reservoirs 58 and 60 is small enough to permit rapid heating of the ink in those reservoirs to the normal 125° C. operating temperature, the temperature control unit 22 can be arranged to maintain the ink in those reservoirs as well as in the orifice passageway 68 at an even lower temperature such as 120° C. when the system is in the stand-by condition.

Since the solidification of molten hot melt ink normally causes the ink to contract in volume, air can be drawn into the passages 72 and 73 when the printing system is turned off and the ink in the system solidifies, leading to start-up problems. In order to avoid such problems, the temperature control unit 22 is arranged to cause the ink in the reservoirs 58 and 60 and the deaerator 64 to be maintained in the molten condition until the ink in the passages 72 and 73 has solidified when the printing system is turned off, thereby preventing air from being drawn into those passages as the reservoir ink solidifies. In addition, the negative pressure normally applied to the reservoirs as described hereinafter may be terminated while the ink in the passages 72 and 73 is cooling to reduce the tendency of air to be drawn into the orifices 30.

In order to maintain the pressure of the ink in the orifices 30 at the desired negative pressure level during operation regardless of the elevation or orientation of the printhead 16 with respect to the remote ink supply reservoir 12, the ink supply conduit 14 leading from the remote ink supply reservoir 12 to the printhead includes a check valve 82 which is spring-biased toward the closed position with sufficient force to require an ink pressure of, for example, at least 5 psi to open the valve and permit ink to pass from the line 14 into the low level reservoir 60. Since the check valve 82 is closed except when ink is being supplied to the reservoir 60, the relative elevation of the printhead 16 with respect to the ink supply reservoir 12 will have no effect on the pressure of the ink in the reservoirs 58 and 60 and in the passages 72 and 73 leading to the orifices 30.

To maintain the pressure in the orifices 30 at the desired negative level during normal operation, the printhead pressure control unit 18 in the main control unit 10 is connected through two conduits 84 and 86 to the reservoirs 58 and 60, respectively, so that a negative air pressure of approximately 2.8 inches of water is normally maintained in those reservoirs. With the orifice array extending in the horizontal direction slightly less than one inch below the reservoirs, as shown in FIG. 2, this pressure level produces a negative air pressure of about two inches at the orifices 30 which is sufficient to prevent ink from seeping out of the orifices as a result of capillary action, but is not low enough to cause air to be drawn into the passages 72 and 73 through the orifices 30, which would interfere with the operation of the system.

As also described in the Hoisington et al. U.S. Pat. No. 4,835,554, each of the ink passages 72 and 73 is connected through a return flow path (not shown) to the ink passages 62 and 66 leading to the other of the two reservoirs 58 and 60. With this arrangement, when the printer is not operating, ink is caused by the difference in the levels in the reservoirs to flow continuously at a low rate from the high level reservoir 58 to the low level reservoir 60 through the deaerator 64 in order to maintain the ink at the orifices 30 in a deaerated condition. As a result, the difference in the ink levels in the reservoirs is gradually reduced, thereby reducing the pressure which causes the ink to flow through the deaerator and the associated passages leading to the orifices 30. In order to restore the difference in the ink level in the reservoirs 58 and 60, the pressure control unit 18 periodically applies a higher negative pressure of about 3.2 inches of water through the line 84 to the ink in the reservoir 58, thereby drawing ink through a check valve 87 from the low level reservoir 60 to the high level reservoir 58 until the difference in the ink levels in the reservoirs balances the applied pressure difference.

In addition, when the ink jet system is started up after being cold, for example after having been turned off overnight, it may be necessary to purge air bubbles and debris from the orifice passages 72 and 73 in order to assure proper operation of the system. This is accomplished by applying a positive pressure of about 2 psi through both of the lines 84 and 86, thereby forcing ink from both reservoirs through the orifice passages 68 and out of the orifices 30 to remove any air bubbles and debris which may be trapped in those passages.

FIG. 4 illustrates the printhead 16 oriented in a position in which the array of orifices 30 extends in the vertical direction, such as to print information on the sides of the containers 34 as described above with reference to FIG. 1. In this case, because of the different elevations of the reservoirs 58 and 60, the ink pressure will normally be less at the orifices supplied by the low level reservoir 60 than at the orifices supplied by the high level reservoir 58, the ink pressure will normally be less at the orifices, which could cause air to be drawn into the ink passages 72 receiving ink from the low level reservoir or produce seepage of ink at the orifices connected to the high level reservoir 58. In order to avoid this potential problem, the pressure control unit 18 is arranged to reduce the negative pressure applied to the high level reservoir while maintaining the desired negative pressure at the low level reservoir. For example, a negative pressure of about 1.1 inches of water may be applied through the line 86 to the low level reservoir 60 while the usual negative pressure of about 2.8 inches of water is applied through the line 84 to the high level reservoir 58, providing a difference of about 1.7 inches of water between the negative pressures applied to the reservoirs to compensate for the difference in the height of the reservoirs as shown in FIG. 4 when the array is oriented in the vertical direction.

FIG. 5 illustrates the printhead when positioned to project ink downwardly from the orifices 30, for example, to the top surfaces of the containers shown in FIG. 2. In this case, the two reservoirs are at the same elevation and the elevational difference between the reservoirs and the orifices is approximately the same as that of FIGS. 2 and 3. Consequently, the same negative pressure of about 2.8 inches of water is applied to both reservoirs.

A representative arrangement of a pressure control unit 18 to provide the various pressure levels described above is illustrated schematically in FIG. 6, in which the pressure control unit 18 and the printhead 16 are shown in dotted outline. In the pressure control unit 18, a pump 90 has an air intake connected through a two-position valve 92 alternatively to a line 94 leading to an intake filter 96 or to a line 98 connected through a first restriction 100, an accumulator 102, a second restriction 104, and a second accumulator 106 and then to a line 108 leading to the filter 96 through a series of three successive restrictions 110, 112 and 114. Each of these restrictions may, for example, constitute a single needle valve or orifice or a number of needle valves or orifices in series or the restrictions may consist of continuous passages of constant reduced cross-sectional area providing flow resistance proportional to their length such as tubes or grooves, as described hereinafter, which avoids the possibility of clogging of orifices or valves.

The pump 90 and the accumulators and restrictions are arranged so that a continuous flow of air is drawn through the filter 96 and the line 108 to provide substantially constant negative pressures of about 3.2 inches of water at a line 116 connected between the restriction 110 and the line 108, about 2.8 inches of water at a line 118 between the restrictions 110 and 112 and about 1.1 inches of water at a line 120 connected between the restrictions 112 and 114. A two-position valve 122 is arranged to selectively connect a line 124 either to the line 116 or to the line 118 and the line 124 is selectively connected through another two-position valve 126 to a line 128 which is, in turn, connected to the conduit 84 leading to the high level reservoir 58 in the printhead 16.

The positive pressure side of the pump 90 is connected to a line 130 which opens to the atmosphere through a restriction 132 arranged to provide a constant positive air pressure of about 2 psi at the pump output line 130. When it is necessary to purge the system to remove debris or air bubbles from the orifice passageways, the valve 126 is moved to a position connecting the positive pressure line 130 through the line 128 and the conduit 84 to the high level reservoir to apply a purging pressure. At the same time, another valve 134 is moved to a position connecting the line 28 to a line 136 connected to the conduit 86 leading to the low level reservoir 60 so that the 2 psi positive pressure is applied to both reservoirs at the same time. As a result, the ink in the orifice passageways 72 and 73 leading to the orifices 30 is ejected under pressure through the orifices, carrying with it any contaminants and air bubbles which may have accumulated.

Figure 6:
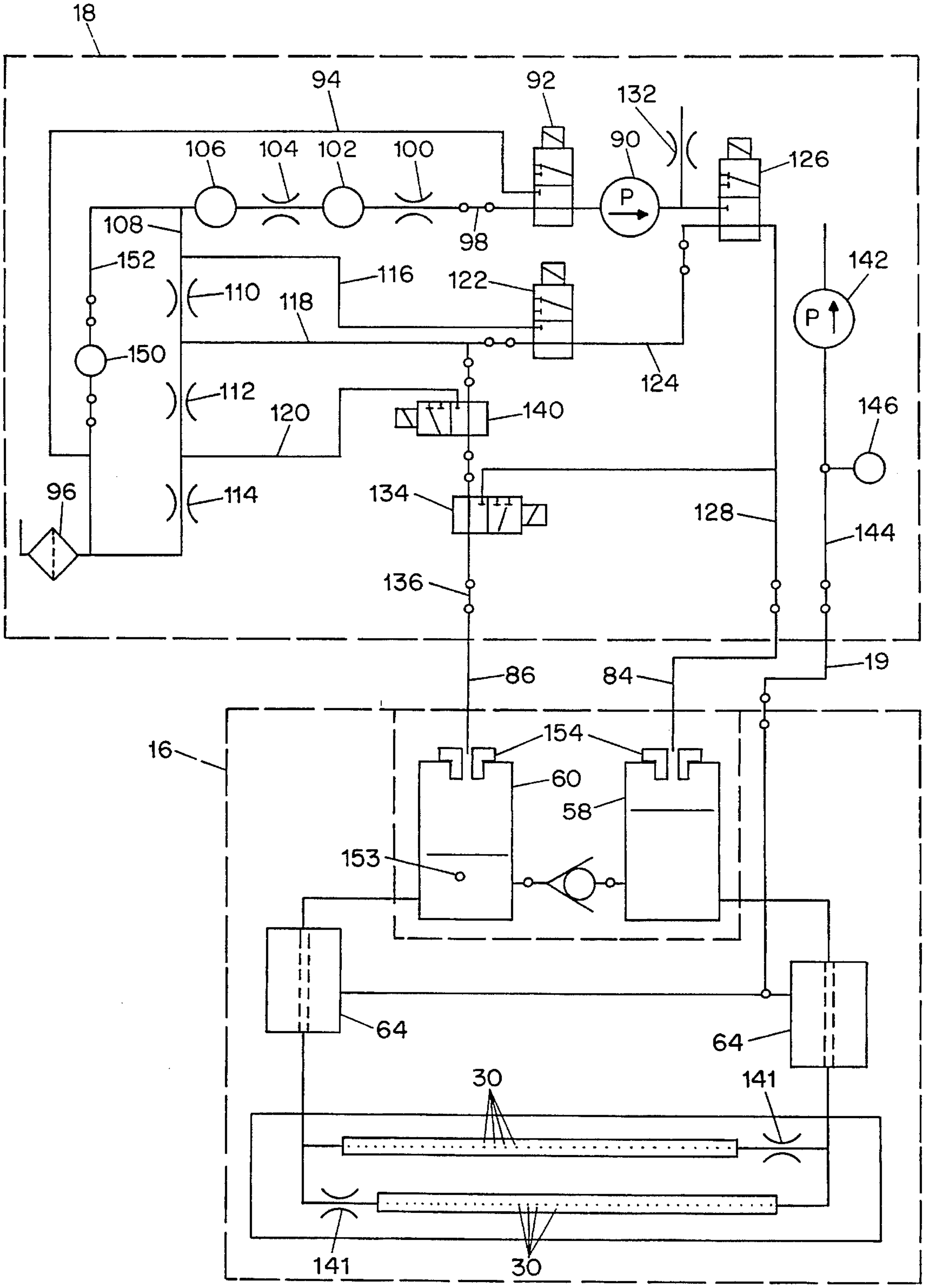
FIG. 6 is a schematic diagram illustrating the arrangement of a representative air pressure control system for controlling the ink pressure in the printhead in accordance with the invention.

After purging is completed, the valves 126 and 134 are restored to the positions illustrated in FIG. 6, causing a negative pressure of about 2.8 inches of water to be applied from the line 118 and the line 124 through the line 128 and the conduit 84 to the high level ink reservoir and through a valve 140, the line 136 and the conduit 86 to the low level ink reservoir. With the array of orifices oriented in the horizontal direction, this negative pressure level is maintained during normal operation.

When the ink level in the high level reservoir has been reduced as a result of the continuous flow of ink through the orifice passageways from the high level reservoir to the low level reservoir as described above, the valve 122 is shifted to the other position, at which the line 116 is connected to the line 128 and the conduit 84 so as to apply a negative pressure of about 3.2 inches of water to the high level reservoir 58, thereby drawing ink from the low level reservoir 60 through the check valve 87 into the high level reservoir. When the desired high ink level in that reservoir has been restored, the valve 122 is returned to the position illustrated in FIG. 6. The rate of continuous flow of ink through the printhead from the high level reservoir to the low level reservoir is controlled by the orifice passageway restrictions 141 illustrated schematically in FIG. 6.

If the printhead 16 is oriented with the array of orifices 30 extending in the vertical direction as shown in FIG. 4 with the right end as viewed in FIG. 6 higher than the left end of the array, the valve 140 is shifted to a position at which the line 120 is connected to the line 136, thereby applying a reduced negative pressure of about 1.1 inches of water through the conduit 86 to the lower reservoir 60 to counteract any tendency for air to be drawn into the orifice passages 72.

In order to supply the necessary high vacuum to the deaerator 64, the pressure control unit 18 includes a vacuum pump 142 generating a vacuum of about 25 in.Hg. which is connected through a line 144 to the conduit 19 leading to the vacuum chamber 70 adjacent to the membrane 68 in the deaerator 64 so as to extract dissolved air from the ink passing through the deaerator. The line 144 includes a vacuum sensor 146 to enable control of the vacuum produced by the pump 142 and applied to the line 144. Similarly, a pressure sensor 150 is included in a line 152 connected between the lines 94 and 108 to permit control of the vacuum drawn by the pump 90 through the lines 98 and 108. Also, to control the supply of ink to the low level reservoir 60 in the printhead, a low ink sensor 153 detects a minimum level of ink in the low level reservoir 60 and initiates the transfer of ink by the pump 53 from the remote ink supply reservoir 12 through the conduit 14 and the check valve 82 to the low level printhead reservoir 60.

In order to inhibit leakage of ink from the reservoirs 58 and 60 into the vacuum lines 84 and 86 when the printhead 16 is being moved or is tilted in such a way that the ink in the reservoirs is adjacent to the openings at which those lines are connected to the reservoirs, each of the reservoirs includes a vacuum shield 154 at the openings connected to vacuum lines. These vacuum shields are made of Teflon or another material which is not wetted by the ink used in the system and they have a 0.016-inch opening at the end facing the ink in the reservoir leading to a 0.04-inch passage extending through the shield to the end connected to the vacuum line. Thus, when no vacuum is applied through the lines 84 and 86 and while the printhead is being reoriented or removed or replaced from the support clamp 28, the reservoirs may be oriented so that the ink is adjacent to the vacuum shields without causing the ink to flow through the vacuum shields to enter the conduits 84 and 86. Thus, the pressure control unit 18 is prevented from being contaminated with ink drawn into the vacuum line even though the printhead may have been oriented in such a way as to cause ink to flow against the openings leading to the vacuum lines while it is being mounted or transported.

Figure 7:
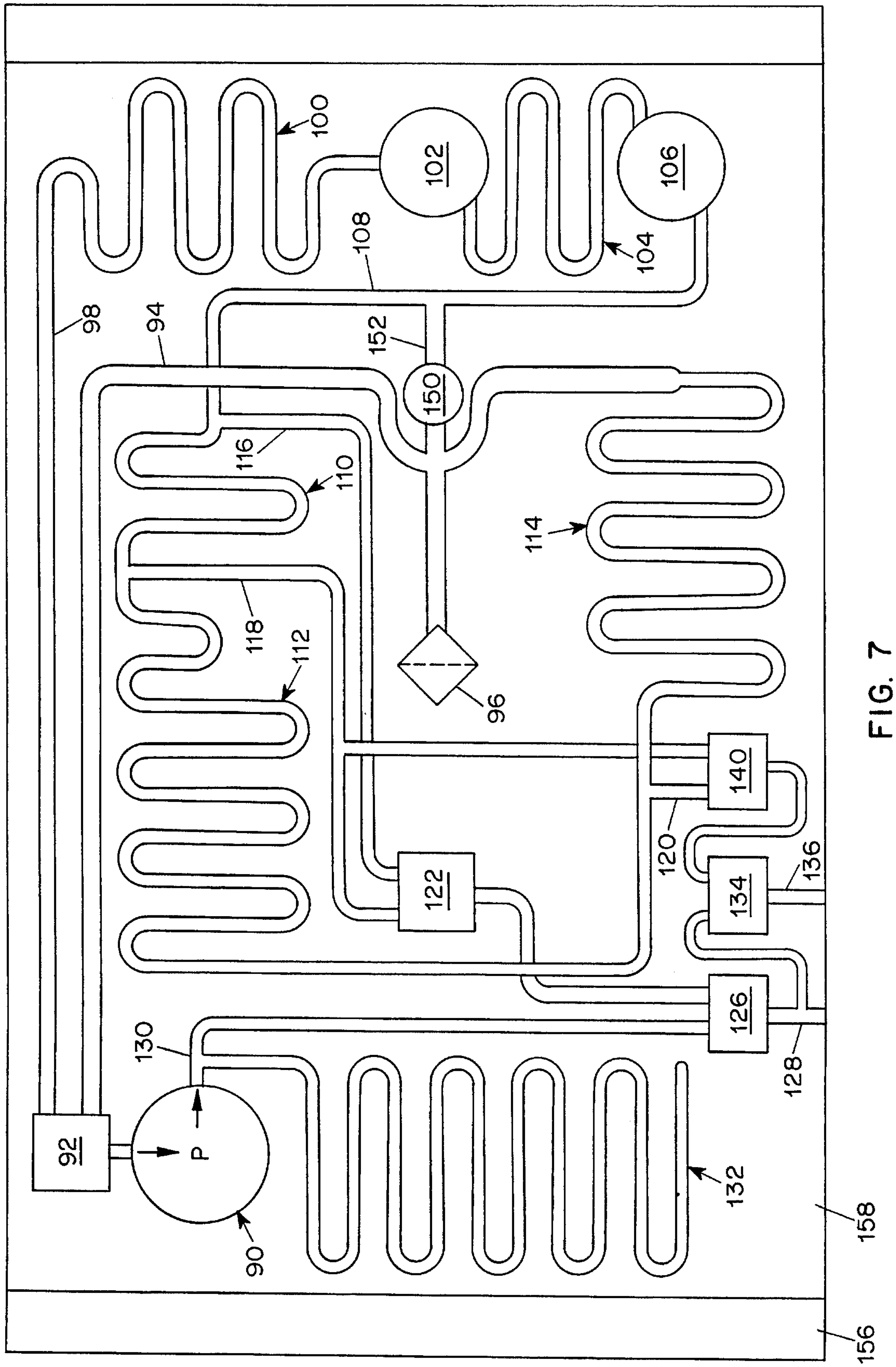
FIG. 7 is a plan view showing the arrangement of a typical air pressure control device for use in controlling ink pressure in the printhead in accordance with the invention.

A typical arrangement for providing various levels of negative and positive pressure in the pressure control unit 18 is illustrated in FIG. 7. In this arrangement, an aluminum plate 156 having a flat upper surface is formed with a series of grooves having uniform depth of about 0.040 inch and a width of approximately 1/16th inch each so as to provide a predetermined uniform resistance to air flow through the grooves. The exposed surface of the plate is covered, for example, by a rigid thermoplastic sheet 158 which may be made of a rigid transparent material such as polystyrene or polymethacrylate laminated to the plate 156 so that the grooves are sealed by a flat surface at the surface of the plate. Thus, the total resistance to the flow of air through each groove is directly proportional to the length of the groove. In order to provide passages to and from the grooves of defined cross-section without substantial resistance to air flow, larger grooves of, for example, 1/8th inch width and depth, are provided.

In the example shown in FIG. 7, the grooves providing the flow restrictions illustrated schematically in the diagram of FIG. 6 are designated by corresponding reference numerals and the other elements of the pressure control system shown in FIG. 6, such as the pump 90, the pressure sensor 150, the valves 92, 122, 126, 134 and 140, are also illustrated schematically in FIG. 7.

With this arrangement, desired pressure levels for a pressure control system can be provided accurately and conveniently by merely forming grooves of predetermined cross-section in the surface of a plate and making the relative lengths of the grooves proportional to the relative pressure differences required. Thus, for example, to provide the negative pressure values of 1.1 inches, 2.8 inches and 3.2 inches of water described above, the three restrictions 114, 112 and 110 connected in series may, for example, have lengths of 11 inches, 17 inches and 4 inches. Moreover, laminating a rigid cover 158 to the plate 156 prevents any air leakage between the cover and the plate while also assuring that the cross-sectional area of the covered grooves is constant throughout their length.

In order to test the pressure control system 18 for leaks after it has been assembled, the valves 126 and 134 are actuated so that the vacuum lines 116, 118 and 120 are disconnected from the lines 84 and 86 leading to the printhead 16 and the system is set to maintain a negative air pressure of, for example, 3.2 inches of water as detected by the sensor 150 between the intake filter 96 and the accumulator 106. Depending upon the system parameters, the duty cycle for the pump 90 normally required to maintain the 3.2 inches negative air pressure may, for example, be about 33%. If the pump duty cycle is significantly different from such predetermined value when the lines 84 and 86 are reconnected by the valves 126 and 134, it will be evident that there is a leak in the system which could lead to faulty performance.

Similarly, the pump duty cycle required to maintain a 2 psi pressure in the lines 84 and 86 leading to the reservoirs 58 and 60 when the valves 126 and 134 are actuated and the printhead is cold so that the ink in the reservoirs is solidified should approximate a predetermined relatively low value, but the duty cycle should increase to a predetermined higher value when the printhead has been heated to melt the ink and permit the applied pressure to force the ink out of the printhead orifices 30 in a purging operation. Again, if the duty cycles required to maintain the desired 2 psi pressure in the cold condition and in the heated condition depart significantly from the predetermined values, leakage or blockage of the pressure supply system is indicated. In this way, the pressure control system can be tested conveniently in conjunction with the printhead after assembly.

Although the invention has been described herein with reference to specific embodiments, many modifications and variations therein will readily occur to those skilled in the art. Accordingly, all such variations and modifications are included within the intended scope of the invention.

I claim:

1. An ink jet printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and air pressure control means connected through an air duct to the printhead means for applying a selected air pressure thereto to maintain a pressure of the ink at the orifices therein at a desired level.

2. A printing system according to claim 1 wherein the orifices in the printhead means are disposed in a directional array and the support means includes positioning means arranged to permit a change in orientation of the directional array of orifices with respect to a horizontal plane.

3. A printing system according to claim 1 including conveyor means for conveying a series of objects on which a pattern is to be printed past the printhead.

4. A printing system according to claim 3 wherein the conveyor means comprises a support member for conveying labels to be printed past the orifices in the printhead means.

5. A printing system according to claim 1 wherein the pressure control means is arranged to generate a plurality of air pressure levels and includes means for selectively applying at least one of the air pressure levels to the ink in the printhead means.

6. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, including pump means for pumping ink from the remote ink supply means through the conduit means to the printhead means and wherein the valve means is responsive to ink pressure exceeding a selected level to permit ink to be transmitted through the conduit means to the printhead means.

7. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, wherein the printhead means includes two ink reservoirs with different ink levels and wherein the orifices in the printhead means are disposed in a directional array and the support means includes positioning means arranged to permit a change in orientation of the directional array of orifices with respect to a horizontal plane and wherein the pressure control means includes means for controlling the ink pressure in the two reservoirs at different levels.

8. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, wherein the support means is arranged to position the printhead means to permit the orifices to project ink drops in a horizontal direction or in a vertical direction.

9. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, including conveyor means for conveying a series of objects on which a pattern is to be printed past the printhead wherein the conveyor means comprises a horizontal conveyor.

10. A printing system according to claim 9 wherein the support means is arranged to position the printhead means with the array of orifices in a horizontal plane to permit printing on upper horizontal surfaces of the objects.

11. A printing system according to claim 9 wherein the support means is arranged to position the printhead with the orifices disposed in a vertical plane to permit printing on vertically-oriented surfaces of the objects.

12. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, wherein the printhead means includes ink deaeration means and wherein the pressure control means includes means for supplying negative air pressure to the printhead means for deaeration of the ink therein.

13. A printing system comprising printhead means for selectively ejecting ink drops through a plurality of orifices toward a surface to form a desired pattern on the surface, remote ink supply means for retaining a supply of ink, conduit means connecting the remote ink supply means with the printhead means to supply ink thereto, support means for supporting the printhead at a variable vertical level with respect to the remote supply means, valve means for normally isolating the ink in the printhead means from the remote ink supply means, and pressure control means connected to the printhead means for maintaining a pressure of the ink at the orifices therein at a desired level, wherein the printhead means includes two ink reservoirs with different ink levels and passage means for conducting ink from a high level reservoir past the orifice means to a low level reservoir and check valve means permitting ink under pressure to be transferred from the low level reservoir to the high level reservoir and wherein the pressure control means includes means for applying air pressure to the low level reservoir which is higher than a pressure applied by the pressure control means to the high level reservoir to cause transfer of ink from the low level reservoir through the check valve means to the high level reservoir.

14. An ink jet printing system comprising printhead means having an array of orifices for selectively ejecting ink toward a surface to produce a desired pattern on the surface, reservoir means in the printhead means including a high level ink reservoir and a low level ink reservoir, and ink pressure control means for controlling a pressure of the ink at the orifices in the printhead means and for applying differential pressure to the ink in the high level ink reservoir and the low level ink reservoir to cause transfer of ink from the low level ink reservoir to the high level ink reservoir comprising pump means for pumping air through a plurality of passageways providing predetermined resistance to flow of air so as to produce selected negative pressure levels, and valve means for selectively connecting the passageways to the high level ink reservoir and the low level ink reservoir in the printhead means to apply selected pressure levels thereto.

15. An ink jet printing system according to claim 14 including restricted orifice means in the printhead means for connecting the pressure control means to the printhead means and for inhibiting passage of ink from the printhead means to the pressure control means.

16. An ink jet printing system according to claim 14 wherein the ink pressure control means comprises a plurality of air flow paths of different length, each providing a different total resistance to air flow to produce different negative pressure levels.

17. An ink jet printing system according to claim 16 wherein the air flow paths are connected in series to produce successively increasing negative pressure levels.

18. An ink jet printing system according to claim 14 wherein the ink pressure control means comprises a plurality of grooves of defined length, depth and width formed in a surface of a plate.

19. An ink jet printing system according to claim 18 wherein the resistance to air flow of the grooves is proportional to the length of the grooves.

20. An ink jet printing system according to claim 18 including thermoplastic plate means sealed to the surface of the grooved plate to enclose the grooves formed therein and assure uniform cross-sectional area of the grooves throughout the length of the grooves.

21. An ink jet printing system according to claim 20 wherein the pump means is mounted on the plate means and including valve means mounted on the plate means for controlling the flow of air through the grooves.

* * * * *

UNITED STATES PATENT AND TRADEMARK OFFICE

CERTIFICATE OF CORRECTION

PATENT NO. : 5,489,925

DATED : February 6, 1996

INVENTOR(S) : Jeffrey B. Brooks et al.

It is certified that error appears in the above-indentified patent and that said Letters Patent is hereby corrected as shown below:

Title page, Item 75 - Inventors delete the following:

--Mark S. Noyes, both of-- and --Frank W. Martines, Temple, all of--.

Column 7, line 21 [Application Page 15, line 5]: "28" should read --128--.

Column 9, line 40 [Application Page 21, line 1]: "I CLAIM" should read --WE CLAIM--.

Signed and Sealed this

Fifteenth Day of October, 1996

*Attest:*

BRUCE LEHMAN

*Attesting Officer*

*Commissioner of Patents and Trademarks*